United States Patent
Harada et al.

(10) Patent No.: US 6,881,792 B2
(45) Date of Patent: Apr. 19, 2005

(54) PRODUCTION PROCESSES FOR BASIC WATER-ABSORBENT RESIN AND WATER-ABSORBING AGENT, AND USE THEREOF

(75) Inventors: Nobuyuki Harada, Suita (JP); Shigeru Sakamoto, Himeji (JP); Yoshifumi Adachi, Himeji (JP); Kazuhisa Hitomi, Himeji (JP); Kazushi Torii, Himeji (JP); Toshimasa Kitayama, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 7 days.

(21) Appl. No.: 10/689,075

(22) Filed: Oct. 21, 2003

(65) Prior Publication Data

US 2004/0087730 A1 May 6, 2004

Related U.S. Application Data

(62) Division of application No. 09/735,936, filed on Dec. 14, 2000, now abandoned.

(30) Foreign Application Priority Data

Dec. 27, 1999 (JP) .......................................... 11-368893

(51) Int. Cl.$^7$ .................................................. C08F 8/00
(52) U.S. Cl. ...................... 525/198; 428/402; 264/540; 525/192; 525/197; 525/417
(58) Field of Search ................................ 525/192, 197, 525/198, 417; 264/540; 428/402

(56) References Cited

U.S. PATENT DOCUMENTS

| | | | |
|---|---|---|---|
| 4,076,663 A | 2/1978 | Masuda et al. | ............ 260/17.4 |
| 4,320,040 A | 3/1982 | Fujita et al. | ................ 524/459 |
| 4,833,222 A | 5/1989 | Siddall et al. | ............... 526/200 |
| 5,118,719 A | 6/1992 | Lind | ........................... 521/92 |
| 5,149,750 A | 9/1992 | Niessner et al. | ............... 526/81 |
| 5,154,713 A | 10/1992 | Lind | ........................... 604/358 |
| 5,264,495 A | 11/1993 | Irie et al. | ..................... 125/301 |
| 5,981,689 A | 11/1999 | Mitchell et al. | ............ 528/229 |
| 6,254,990 B1 | 7/2001 | Ishizaki et al. | ............. 428/402 |

FOREIGN PATENT DOCUMENTS

| | | |
|---|---|---|
| EP | 0372981 | 6/1990 |
| EP | 0496594 | 7/1992 |
| EP | 0937739 | 8/1999 |
| EP | 0949290 | 10/1999 |
| JP | 492350 | 1/1974 |
| WO | 9615180 | 5/1996 |
| WO | 9617681 | 6/1996 |
| WO | 9824832 | 6/1998 |
| WO | 9837149 | 8/1998 |
| WO | 9925393 | 5/1999 |
| WO | 9930751 | 6/1999 |
| WO | 9934841 | 7/1999 |
| WO | 9934842 | 7/1999 |
| WO | 9934843 | 7/1999 |
| WO | 9947587 | 9/1999 |
| WO | 0009612 | 2/2000 |

*Primary Examiner*—Bernard Lipman
(74) *Attorney, Agent, or Firm*—Roylance, Abrams, Berdo & Goodman, L.L.P.

(57) ABSTRACT

The present invention provides: a production process for a basic water-absorbent resin to be a main component of a water-absorbing agent which exhibits an excellent water absorption capacity under a load with high productivity; a production process for a water-absorbing agent; and use thereof. The production process for an irregular shape basic water-absorbent resin comprises the step of reacting a basic resin and a crosslinking agent in order to obtain the basic water-absorbent resin, with the process forwarding a crosslinking reaction and pulverizing the resultant product at the same time. The first production process for a water-absorbing agent comprises the step of blending an acidic water-absorbent resin with the basic water-absorbent resin obtained by the above-mentioned process. The second production process for a water-absorbing agent comprises the step of obtaining a mixture of an acidic water-absorbent resin and the basic water-absorbent resin by coexisting with the acidic water-absorbent resin when carrying out the crosslinking reaction and the pulverization in the above-mentioned process.

15 Claims, No Drawings

PRODUCTION PROCESSES FOR BASIC WATER-ABSORBENT RESIN AND WATER-ABSORBING AGENT, AND USE THEREOF

This application is a divisional application of Ser. No. 09/735,936, filed Dec. 14, 2000, now abandoned.

BACKGROUND OF THE INVENTION

A. Technical Field

The present invention relates to production processes for a basic water-absorbent resin and a water-absorbing agent, and use thereof.

More particularly, the present invention relates to a production process for a water-absorbing agent which exhibits a greatly enhanced water absorption capacity under a load, and a production process for a basic water-absorbent resin that is a main component thereof.

B. Background Art

In recent years, so-called water-absorbent resins are widely used as constituent materials of sanitary materials, such as disposable diapers, sanitary napkins, and so-called incontinent pads, for the purpose of causing the water-absorbent resins to absorb body fluids.

Known examples of the above water-absorbent resins include: crosslinked products of partially neutralized polyacrylic acids; hydrolyzed products of starch-acrylic acid graft polymers; saponified products of vinyl acetate-acrylic acid ester copolymers; and hydrolyzed products of acrylonitrile- or acrylamide copolymers, and their crosslinked products.

However, almost all of these conventionally known water-absorbent resins are products by neutralizing their acid groups of acidic water-absorbent resins with compounds of alkaline metals. Therefore, in the case where the surface neighborhood of particles of the resins is not secondarily crosslinked, their absorption capacity under a load for a physiological salt solution is below 10 g/g, and further, even if the surface neighborhood of particles of the resins is secondarily crosslinked, their absorption capacity under a load for artificial urine is merely 30 g/g at the highest. Thus, it is desired to develop a novel water-absorbing agent which can absorb much water to swell therewith even under loaded conditions.

To solve such problems, WO 96/15180, WO 96/17681, WO 98/24832, WO 98/37149, WO 99/34841, WO 99/34842, WO 99/34843, WO 99/25393, and WO 99/30751 propose water-absorbing agents which comprise an acidic water-absorbent resin and a basic water-absorbent resin. However, in the methods described in these patents, the basic water-absorbent resin to be a main component of the water-absorbing agents was pulverized once after being in a lump gel state, and blended with the acidic water-absorbent resin further after adjusting the particle size of the basic water-absorbent resin to the most suitable size if necessary. Therefore, in large scale production, very large lump gel has to be treated, and the equipment therefor not only becomes large but also has low productivity. In addition, batchwise qualities could not but be unstable. Particularly, if the hydrogel was pulverized mechanically after forming the lump gel once, networks once formed by crosslinking had to be cut. Then, there were problems such that an extractable content increased, a crosslinked structure did not become uniform, and much energy was required in order to pulverize the gel. Furthermore, EP 949290A2 proposes a method which comprises carrying out a crosslinking reaction of a basic resin in a suspension state. However, an organic solvent is used in the method. Therefore, the equipment therefor not only becomes large but also has low productivity because the method needs a step of removing the organic solvent.

SUMMARY OF THE INVENTION

A. Objects of the Invention

The present invention was completed in consideration of the above-mentioned conventional problems. An object of the present invention is to provide a production process for a basic water-absorbent resin to be a main component of a water-absorbing agent which exhibits an excellent water absorption capacity under a load, 1) preferably with one step, 2) with a small equipment, 3) inexpensively, 4) in high quality stably, and 5) with high productivity. In addition, another object of the present invention is to provide a production process for a water-absorbing agent which exhibits an excellent water absorption capacity under a load, 1) with a small equipment, 2) inexpensively, 3) in high quality stably, and 4) with high productivity. Furthermore, if the water-absorbing agent obtained by the process according to the present invention is used as a constituent material of absorbent articles such as diapers, the leakage can be remarkably decreased and their surfaces can be kept in a rustling dry state, even in the case of a long-term use. In addition, a water-absorbing agent obtained by the process according to the present invention can be used for a constituent material of odor control articles that are excellent in an effect of neutralizing smell such as ammonia, acetaldehyde and mercaptan.

B. Disclosure of the Invention

The present inventors diligently studied novel production processes for a basic water-absorbent resin and a water-absorbing agent that can attain the above-mentioned objects. As a result, they completed the present invention.

That is to say, a production process for a basic water-absorbent resin, according to the present invention, comprises the step of reacting a basic resin and a crosslinking agent in order to obtain the basic water-absorbent resin, with the process being characterized by forwarding a crosslinking reaction and pulverizing the resultant product (the resultant crosslinked mixture) at the same time.

A production process for a water-absorbing agent, according to the present invention, comprises the step of blending an acidic water-absorbent resin with the basic water-absorbent resin obtained by the above-mentioned process.

Another production process for a water-absorbing agent, according to the present invention, comprises the step of obtaining a mixture of an acidic water-absorbent resin and the basic water-absorbent resin by coexisting with the acidic water-absorbent resin when carrying out the crosslinking reaction and the pulverization in the above-mentioned process.

These and other objects and the advantages of the present invention will be more fully apparent from the following detailed disclosure.

DETAILED DESCRIPTION OF THE INVENTION

Hereinafter, the present invention is explained in detail.

In the present invention, the basic water-absorbent resin is a basic water-absorbent resin which exhibits basicity in pure water and is crosslinked to such an extent that it can absorb pure water to swell therewith. In the present invention, the basic water-absorbent resin which exhibits basicity in water, for example, exhibits a pH of more than 8 in pure water preferably and a water absorption capacity of not less than 1 g/g for pure water preferably. Examples of the basic water-absorbent resin, showing the above property values, include basic resins that contain basic groups (of which 50 to 100 mol %, more preferably 70 to 100 mol %, most preferably 90 to 100 mol %, are present in the unneutralized (free) basic form) and are crosslinked slightly to such an extent that they can be water-insoluble. In the present invention, more preferably usable examples of the basic water-absorbent resin include amino-group-containing basic resins containing a primary to tertiary amino group (amine group) in which 50 to 100 mol % of the amino group (amine group) are present in the unneutralized (free) basic form, and which are crosslinked slightly to such an extent that they can be water-insoluble.

In the present invention, examples of the basic resin as used include a hydrophilic basic resin that is not crosslinked, wherein the resin is substantially water-soluble or water-dispersible in a state before crosslinked. Examples of such the hydrophilic basic resin that are not crosslinked include: straight-chain-having polyalkyleneamine, branched-chain-having polyalkyleneamine, polyvinylamine, polyallylamine, poly(N-vinylimidazole), polyvinylpyridine, poly(vinylpyridineamine oxide), polydiallylamine, polyamidepolyamine, poly(dimethylaminoalkyl acrylate), poly(dimethylaminoalkyl methacrylate), polydimethylaminoalkylacrylamide, polydimethylaminoalkylmethacrylamide, polyamidine, poly(hydrazineacrylic acid), asparagic acid-hexamethylenediamine polycondensation products; basic polyamino acids (e.g. polylysine); basic resins derived from natural products (e.g. Chitosan); and copolymers of these polymers. These need to be changeable into basic water-absorbent resins by crosslinking reactions. The basic resin is preferably the amino-group-containing basic resin; more preferably, at least one member selected from the group consisting of polyethylenimine, polyallylamine, polyvinylamine, polydiallylamine, and polydiallyldimethylamine, and containing a basic group in which 90 to 100 mol % of the unneutralized (free) basic groups are present in the free basic form; and most preferably, at least one member selected from the group consisting of polyethylenimine, polyallylamine and polyvinylamine. In addition, the average molecular weight of the basic resin before crosslinking is preferably in the range of about 1,000 to about 10,000,000.

The basic water-absorbent resin in the present invention, can be obtained by crosslinking the corresponding basic resin with a crosslinking agent having at least two groups that are reactable upon a functional group (e.g. amino group (amine group)) of the basic resin and capable of forming a covalent bond. When the above functional group is an amino group (amine group), usable examples of the crosslinking agent include compounds that are conventionally used and have per molecule at least two groups, such as epoxy groups, aldehyde groups, alkyl halide groups, isocyanate groups, carboxyl groups, acid anhydride groups, acid halide groups, ester bonding moieties and active double bonds. Examples of such a crosslinking agent include: bisepoxy compounds; epichlorohydrin; dihalides (e.g. dibromoethylene); formalin; dialdehyde compounds (e.g. glyoxal); diglycidyl ethers of (poly)ethylene glycols, diglycidyl ethers of (poly)propylene glycols, diglycidyl ethers of dihydric alcohols (e.g. neopentyl alcohol), polyglycidyl ethers of glycerol; α,β-unsaturated carboxylic acid esters (e.g. methyl acrylate and ethyl acrylate); di-α, β-unsaturated carbonyl compounds (e.g. methylenebisacrylamide); and α,ω-alkylenediisocyanate, but there is no limitation thereto. The kind and the amount of the crosslinking agent are selected in view of factors such as water absorption capacity or strength of the resultant basic water-absorbent resin, but, when the basic resin is the amino-group-containing basic resin, the amount thereof is preferably in the range of 0.001 to 20 mol % of the amine unit of the polymer. In the case where the amount of the crosslinking agent is smaller than 0.001 mol %, the water absorption capacity of the resultant basic water-absorbent resin is low, and further, its strength is insufficient. In the case where the amount is more than 20 mol %, the water absorption capacity might be very low.

The production process for a basic water-absorbent resin, according to the present invention, is characterized by comprising the step of giving shear stress to a basic resin and a crosslinking agent in order to forward a crosslinking reaction and to pulverize the resultant crosslinked mixture at the same time. In the present invention, the pulverization means that gel formed by crosslinking is broken finely to such an extent that the resultant gel particle has fluidity. The basic resin and the crosslinking agent come into contact and the basic resin is crosslinked with the crosslinking agent, by giving shear stress to the basic resin and the crosslinking agent. Then, the shear stress is further given. Thereby, a uniform crosslinking structure is introduced into the gel basic water-absorbent resin as obtained while forwarding the crosslinking reaction, and the gel is broken particulately. The crosslinking density distribution in the respective produced basic water-absorbent resin becomes more uniform by forwarding the crosslinking reaction and pulverizing the resultant crosslinked mixture at the same time. As a result, basic water-absorbent resin particles being characterized by having uniform particle size, exhibiting an excellent water absorption capacity, and having little extractable content, can be produced with high productivity. These characteristics cannot be not accomplished by a conventional method which comprises the steps of forming lump gel, and pulverizing the gel thereafter. The most suitable basic water-absorbent resin used for the water-absorbing agent according to the present invention, can be obtained by forwarding the crosslinking reaction and pulverizing the resultant crosslinked mixture at the same time. The basic resin and the crosslinking agent may be supplied respectively in a diluted solution state or in a solution state without dilution, before forwarding the crosslinking reaction and pulverizing the resultant crosslinked mixture at the same time.

In the present invention, the basic resin and the crosslinking agent may be supplied respectively after blending them beforehand in a solution state or in a liquid state. When they are blended in the solution state, an aqueous solution is preferably used as a solvating medium. The concentration of the entirety of the basic resin and the crosslinking agent in a blended state is preferably not less than 40 weight %, more preferably not less than 80 weight %. The most preferable embodiment in order to control suitable crosslinking density distribution and particle, is that both are blended beforehand in a solution state without dilution. It is more preferable that both are blended beforehand in as high concentration state as possible (for example, in a solution state without dilution), because the basic water-absorbent resin having uniform crosslinking density distribution can be obtained with high productivity. When blending both, blenders need not particularly be used if both come into contact under the condition that a turbulent flow is generated. In addition, both may be blended in a vessel mentioned below. It is preferable that both are blended in pipe fluid blenders such as line mills equipped with a machine that generates a turbulent flow positively. Examples of the pipe fluid blenders include conventional instruments such as static pipe blending instruments and blending instruments equipped with liquid shear mechanism. Examples of the static pipe blending instruments include Noritake static mixer (made by Noritake Company Ltd.), Sulzer mixer (made by Sumitomo Heavy Machine Co., Ltd.), Toray static pipe blender (Toray Industries Inc.), Square mixer (Sakura Seisakusho Co., Ltd.) and TK-ROSS-LPD mixer (Tokusyu Kika Kogyo Co., Ltd.). Examples of the blending instruments equipped with liquid shear mechanism include a homomixer and a homogenizer.

In the present invention, the basic resin and the crosslinking agent are given shear stress, and converted to the basic water-absorbent resin according to the present invention by forwarding the crosslinking reaction and pulverizing the resultant crosslinked mixture at the same time. Furthermore, in another embodiment, the basic resin and the crosslinking agent are crosslinked in a vessel by giving shear stress and the pulverization is carried out at the same time, and further, the basic water-absorbent resin according to the present invention is produced by exhausting the resultant crosslinked mixture from the vessel discontinuously. In yet another embodiment, the basic resin and the crosslinking agent are supplied into a vessel equipped with a rotary stirring shaft continuously, then crosslinked in a vessel by giving shear stress from the rotary stirring shaft and the pulverization is carried out at the same time, and further, the basic water-absorbent resin according to the present invention is produced by exhausting the resultant crosslinked mixture from the vessel continuously. Examples of the reaction vessel, which enables to forward the crosslinking reaction and carry out the pulverization, include conventional vessels such as cylinder type blenders, turbulizers, nauta blenders, V-character-shaped blenders, paddle dryers, extruders, double-arm type kneaders, banbery mixers, screw type blenders, universal blenders, twin-screw extruders, rotary blenders, and roll mixers. Examples of the reaction vessel, which enables to forwarding the crosslinking reaction of the basic resin and the crosslinking agent by giving shear stress and pulverizing the resultant crosslinked mixture at the same time; and further exhausting the resultant reaction mixture from the vessel discontinuously, include cylinder type blenders, nauta blenders, V-character-shaped blenders, double-arm type kneaders, banbery mixers, and universal blenders. The double-arm type kneaders is preferable. Examples of the reaction vessel, which enables to supplying the basic resin and the crosslinking agent into the vessel equipped with a rotary stirring shaft continuously; forwarding the crosslinking reaction by giving shear stress from the rotary stirring shaft and pulverizing the resultant crosslinked mixture at the same time; and further exhausting the resultant reaction mixture from the vessel continuously, include KRC Kneader, turbulizers, paddle dryers, extruders, screw type blenders, twin-screw extruders, and continuous kneaders. In addition, the temperature and reaction time of the crosslinking reaction is dependent upon combinations of the basic resin and the crosslinking agent as used. However, the temperature is in the range of room temperature to 150° C., and the reaction time is in the range of a few seconds to a few hours generally. It is preferable that the temperature is in the range of room 50 to 120° C. and the reaction time is in the range of a few seconds to one hour. It is preferable that the crosslinking reaction is stopped in the vessel within the holding time especially in case of carrying out procedures continuously. It is preferable to select a condition that the reaction is carried out at 50 to 120° C. and stopped for a few seconds to 50 minutes, in order to make the vessel compact.

In addition, the reaction may be carried out under reduced, ordinary or compressed pressure. Furthermore, in case of using an aqueous solution as the solvent, the reaction can be carried out with removing the aqueous solution at the same tine, while forwarding the crosslinking reaction and carrying out the pulverization at the same time.

In the present invention, the basic water-absorbent resin as obtained like this, can be converted to a desired basic water-absorbent resin by way of further a process for adjusting the particle size, or (a process for washing by water and/or a process for drying) if necessary. In addition, pulverized extent and particle size of the basic water-absorbent resin as obtained can be controlled by controlling the rotational speed of the rotary stirring shaft and the shape of the stirring paddle.

For example, the basic water-absorbent resin as obtained like this, according to the present invention, is irregular shape, and at least 80 weight % of the basic water-absorbent resin particles have a particle size of 10 to 1000 $\mu$m. The basic water-absorbent resin has a water extractable content of less than 10 weight %, and a water absorption capacity of 1 to 100 g/g. The basic water-absorbent resin as obtained like this, according to the present invention, is converted to the water-absorbing agent being excellent in water absorption capacity under a load, according to the present invention, by further blending the acidic water-absorbent resin. Particularly, it is preferable to control the water extractable content of the basic water-absorbent resin to be less than 5 weight %, the average particle size to be in the range of 100 to 850 $\mu$m (preferably 200 to 300 $\mu$m), and the water absorption capacity to be in the range of 5 to 20 g/g, in order that the basic water-absorbent resin can be blended with the acidic water-absorbent resin and then the resultant mixture can be used as the water-absorbing agent.

In the present invention, the acidic water-absorbent resin is a water-absorbent resin which exhibits acidity in pure water and is crosslinked to such an extent that it can absorb pure water to swell therewith. In the present invention, the acidic water-absorbent resin, for example, exhibits a pH of less than 6 in pure water preferably and a water absorption capacity of preferably not less than 1 g/g (more preferably not less than 10 g/g). Examples of the acidic water-absorbent resin, showing the above property values, include acidic resins that contain acid groups (of which 50 to 100 mol %, more preferably 70 to 100 mol %, most preferably 90 to 100 mol %, are present in the unneutralized (free) acid form) and are crosslinked slightly to such an extent that they can be water-insoluble. In the present invention, more preferably usable examples of the acidic water-absorbent resin include acidic water-absorbent resins that contain at least one acid group selected from the group consisting of carboxylic acid groups, sulfonic acid groups, and phosphoric acid groups. In the present invention, the acidic water-absorbent resin, for example, can be obtained by conventional processes, such as a) a process comprising the step of polymerizing an acid-group-containing polymerizable monomer in the presence of a copolymerizable crosslinking agent, and b) a process comprising the step of post-crosslinking an acid-group-containing polymer resultant from the polymerization of the acid-group-containing polymerizable monomer. In addition, the acidic water-absorbent resin, usable in the present invention, may be a crosslinked polypeptide, such as a crosslinked product of polyaspartic or polyglutamic acid, or an acid water-swellable crosslinked polymer, as derived from a natural product, such as crosslinked carboxymethyl cellulose.

The post-crosslinking treatment of the acid-group-containing polymer, for example, can be achieved by processes to introduce a crosslinked structure into the polymer, such as I) a process involving heat treatment, II) a process involving the irradiation of radiations such as electron beams and gamma rays, III) a process involving the use of a compound having, per molecule, at least two functional groups reactable upon a functional group of the acid-group-containing polymer, such as polyethylene glycol diglycidyl ether, glycerol diglycidyl ether, ethylene glycol, polyethylene glycol, propylene glycol, glycerol, pentaerythritol, ethylenediamine, polyethylenimine, and ethylene carbonate.

In the present invention, an example of more preferably usable production processes for the acidic water-absorbent resin is the above process a) comprising the step of polymerizing an acid-group-containing polymerizable monomer in the presence of a copolymerizable crosslinking agent, in view of the ease of controlling the resulting degrees of polymerization and crosslinking.

In the present invention, preferably usable examples of the acid-group-containing polymerizable monomer include: polymerizable monomers containing a carboxylic acid group, such as acrylic acid, methacrylic acid, ethacrylic acid, crotonic acid, sorbic acid, maleic acid, itaconic acid, and cinnamic acid, and their anhydrides; polymerizable monomers containing a sulfonic acid group, such as vinylsulfonic acid, allylsulfonic acid, styrenesulfonic acid, vinyltoluenesulfonic acid, 2-(meth)acrylamido-2-methylpropanesulfonic acid, 2-(meth)acryloylethanesulfonic acid, and 2-(meth)acryloylpropanesulfonic acid; and polymerizable monomers containing a phosphoric acid group, such as 2-hydroxyethylacryloyl phosphate, 2-hydroxyethylmethacryloyl phosphate, phenyl-2-acryloyloxyethyl phosphate, and vinyl phosphate.

Among them, preferable ones are polymerizable monomers containing a carboxylic or sulfonic acid group, particularly preferably, a carboxylic acid group, and the most preferable is acrylic acid. These acid-group-containing monomers may be used either alone respectively or in combinations with each other.

In the present invention, if necessary, other polymerizable monomers can be used along with the above acid-group-containing monomer. Examples of such other polymerizable monomers include: alkyl esters or alkylene oxide esters of unsaturated carboxylic acids (e.g. acrylic acid, methacrylic acid, ethacrylic acid, crotonic acid, sorbic acid, maleic acid, itaconic acid, cinnamic acid), such as methyl (meth)acrylate, ethyl (meth)acrylate, methoxypolyethylene glycol (meth)acrylate, and polyethylene glycol mono(meth)acrylate; aromatic vinyl hydrocarbons, such as styrene; aliphatic vinyl hydrocarbons, such as ethylene, propylene, and butene; unsaturated nitriles, such as acrylonitrile; and unsaturated amides, such as acrylamide and methacrylamide.

In the present invention, preferably usable examples of the copolymerizable crosslinking agent, which is copolymerizable with the acid-group-containing polymerizable monomer, include: compounds (1) having at least two polymerizable double bonds; and compounds (2) having at least one polymerizable double bond and at least one functional group reactive upon the monomer.

Specific examples of compound (1) above include the following: N,N'-methylenebis(meth)acrylamide, N,N'-methylenebis(N-vinylalkylamide), (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-denatured trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxyalkanes, divinylbenzene, divinyltoluene, divinylxylene, divinylnaphthalene, divinyl ether, divinyl ketone, trivinylbenzene, tolylene diisocyanate, hexamethylene diisocyanate.

Examples of compound (2) above include: compounds having an epoxy group and a polymerizable double bond in a molecule, such as glycidyl (meth)acrylate; compounds having a hydroxy group and a polymerizable double bond in a molecule, such as N-methylol(meth)acrylamide; unsaturated compounds containing a primary to quaternary amino group (amine group), such as N,N,N-trimethyl-N-(meth)acryloyloxyethyltrimethylammonium chloride, N,N,N-triethyl-N-(meth)acryloyloxyethyltrimethylammonium chloride, dimethylaminoethyl (meth)acrylate, diethylaminoethyl (meth)acrylate, allylamine, and vinylpyridine.

Among the copolymerizable crosslinking agents, preferable ones are: bis(meth)acrylamide; di- or poly-esters from polyols and unsaturated monocarboxylic acids; and polyallyl compounds. A particularly preferable one is at least one member selected from the group consisting of N,N'-methylenebisacrylamide, trimethylolpropane tri(meth)acrylate, (poly)ethylene glycol diacrylate, triallylamine, and poly(meth)allyloxyalkanes.

In the present invention, the amount of the copolymerizable crosslinking agent is usually in the range of 0.001 to 10%, preferably 0.01 to 5%, of the total weight of the entire polymerizable monomers and the copolymerizable crosslinking agent. In the case where the amount of the copolymerizable crosslinking agent is smaller than 0.001%, the resultant acidic water-absorbent resin might merely exhibit low gel strength when absorbing water. In the case where the amount exceeds 10%, it is not preferable because the water absorption capacity might be low.

The amount of other polymerizable monomer, as used if necessary, is usually not larger than 40%, preferably not larger than 20%, of the total weight of the entirety of the polymerizable monomer and the copolymerizable crosslinking agent.

Incidentally, when the polymerization is carried out, it is permitted to add to the polymerizable monomer the following compounds: hydrophilic polymers, such as starch (including derivatives thereof), cellulose (including derivatives thereof), polyvinyl alcohol, polyacrylic acid, and crosslinked polyacrylic acid; chain transfer agents, such as hypophosphorous acid (or its salts); and water-soluble or water-dispersible surfactants. Incidentally, these compounds, which may be added to the polymerizable monomer, are for example disclosed in U.S. Pat. No. 4,076,663, U.S. Pat. No. 4,320,040, U.S. Pat. No. 4,833,222, U.S. Pat. No. 5,118,719, U.S. Pat. No. 5,149,750, U.S. Pat. No. 5,154,713, U.S. Pat. No. 5,264,495, EP 0372981, and EP 0496594.

In the present invention, bulk polymerization or precipitation polymerization is, for example, available as the method to polymerize the acid-group-containing monomer or as the method to polymerize the acid-group-containing monomer and the copolymerizable crosslinking agent, and further, other polymerizable monomers as used if necessary. However, considering the performance or the easiness of the polymerization control, it is preferable to carry out aqueous solution polymerization or reversed-phase suspension polymerization using the monomer in the form of its aqueous solution. Incidentally, examples of solvents, usable for this aqueous solution polymerization or reversed-phase suspension polymerization, include water, methanol, ethanol, acetone, N,N-dimethylformamide, dimethyl sulfoxide, methyl ethyl ketone, and any mixture thereof. When the solvent is used, the concentration of the acid-group-containing monomer is not especially limited, but is usually not less than 10%, preferably in the range of 15 to 80%, on the weight basis. In addition, the polymerization temperature is usually in the range of 0 to 150° C., preferably 10 to 100° C.

In addition, the method of initiating the polymerization may be conventional polymerization methods, for example, involving the use of radical polymerization catalysts or the irradiation of such as radiations, electron beams, or ultraviolet rays.

As to the method involving the use of radical polymerization catalysts, examples of those catalysts include: inorganic peroxides, such as potassium persulfate, ammonium persulfate, and sodium persulfate; organic peroxides, such as t-butyl hydroperoxide, hydrogen peroxide, benzoyl peroxide, and cumene hydroperoxide; and azo compounds, such as 2,2'-azobis(2-amidinopropane) dihydrochloride, azoisobutyronitrile, and azobiscyanovaleric acid. When oxidizable radical polymerization catalysts such as peroxides are used, they may be combined with reductants, such as sodium sulfite, sodium hydrogensulfite, ferrous sulfate, and L-ascorbic acid, to carry out redox polymerization. In addition, it is also permitted to use the radical polymerization catalysts jointly with each other. Furthermore, it is permitted that the amount of the radical polymerization catalyst, as used, is a conventional one. For example, the radical polymerization catalyst is used in the ratio of usually 0.0005 to 5%, preferably 0.0001 to 1%, of the total weight of the entire polymerizable monomers and the copolymerizable crosslinking agent.

In the present invention, the acidic water-absorbent resin as obtained is substantially used in a dried powdery state by way of conventional drying, pulverizing and sieving processes if necessary. The acidic water-absorbent resin having a water content of less than 20 weight % and being powdery in the range of 10 to 1000 μm can be preferably converted to the water-absorbing agent according to the present invention, by blending with the basic water-absorbent resin. In case where the water content of the acidic water-absorbent resin is not less than 20 weight %, it is necessary to note that the salt removing effect of the water-absorbing agent as obtained may be low owing to a blending condition with the basic water-absorbent resin.

The production process for a water-absorbing agent, according to the present invention, comprises the step of: blending the basic water-absorbent resin and the acidic water-absorbent resin, wherein the basic water-absorbent resin is obtained by forwarding a crosslinking reaction of the basic resin and the crosslinking agent and pulverizing the resultant crosslinked mixture at the same time. Examples of the process include following Method (a) and Method (b).

(a) After preparing the basic water-absorbent resin obtained by forwarding a crosslinking reaction of the basic resin and the crosslinking agent and pulverizing the resultant crosslinked mixture at the same time, and the acidic water-absorbent resin respectively beforehand, both resins are blended.

(b) The crosslinking reaction of the basic resin is forwarded, and the resultant crosslinked mixture is pulverized and blended with the acidic water-absorbent resin at the same time, by coexisting with the acidic water-absorbent resin when forwarding the crosslinking reaction of the basic resin and the crosslinking agent and pulverizing the resultant crosslinked mixture at the same time.

In above Method (a), the blending ratio of the basic water-absorbent resin and the acidic water-absorbent resin is changed owing to the purpose and the kind of a solution to be absorbed. However, the ratio by weight (in terms of solid content) is preferably 95:5 to 5:95, more preferably 90:10 to 10:90. In addition, as to blending the basic water-absorbent resin and the acidic water-absorbent resin, the blender is not especially limited if both resins can be blended. Examples of the blender include cylinder type blenders, double-wall cone type blenders, V-character-shaped blenders, ribbon type blenders, screw type blenders, fluidized-furnace rotary disk type blenders, gas current type blenders, double-arm type kneaders, internal blenders, rotary blenders, shear type blenders, turbulizers, universal blenders, nauta blenders, and fluidized-bed type blenders. In addition, each particle of the basic water-absorbent resin and the acidic water-absorbent resin may be treated with surface crosslinking before blending both resins.

The above described basic resin and crosslinking agent are used as the basic resin and the crosslinking agent in above Method (b). The basic resin contains base groups (of which 50 to 100 mol % preferably, more preferably 70 to 100 mol %, most preferably 90 to 100 mol %, are present in the unneutralized (free) base form). In addition, the concentration of the basic resin as used is preferably not less than 50 weight %, more preferably not less than 80 weight %, most preferably not less than 98 weight %.

As to the amount of the crosslinking agent as used in above Method (b), when the basic resin is the amino-group-containing basic resin, the amount thereof is preferably in the range of 0.001 to 20 mol % of the amine unit of the polymer. In addition, the blending ratio of the basic resin and the acidic water-absorbent resin by weight (in terms of solid content) is preferably 90:10 to 10:90, more preferably 80:20 to 20:80, most preferably 70:30 to 30:70.

The water content of the acidic water-absorbent resin as used in above Method (b), is preferably less than 20 weight %.

As to blending the basic resin, the crosslinking agent and the acidic water-absorbent resin, the blender is not especially limited if the three resins can be blended. Examples of the blender include KRC Kneader, turbulizers, paddle dryers, extruders, screw type blenders, twin-screw extruders, and continuous kneaders. In addition, when carrying out the crosslinking reaction, the temperature is in the range of room temperature to 150° C., and the reaction time is in the range of a few seconds to a few hours generally. It is preferable that the temperature is in the range of room 50 to 120° C. and the reaction time is in the range of a few seconds to one hour. It is preferable that the crosslinking reaction is stopped in the vessel within the holding time especially in case of carrying out procedures continuously. It is preferable to select a condition that the reaction is carried out at 50 to 120° C. and stopped for a few seconds to 50 minutes, in order to make the vessel compact. In addition, the reaction may be carried out under reduced, ordinary or compressed pressure.

The above Method (b) enables to produce the water-absorbing agent in one step with higher productivity than the Method (a), because the basic water-absorbent resin obtained by the crosslinking reaction of the basic resin and the crosslinking agent is not isolated.

The water-absorbing agent, as obtained by the production process according to the present invention, can be converted to a water-absorbing agent having a desired particle size, by being dried and pulverized if necessary. When the water-absorbing agent is dried, the drying temperature is, for example, in the range of 50 to 200° C., and the water-absorbing agent is dried in inert gas atmosphere such as nitrogen as the case may be. Examples of the dryers include hot blow dryers, rotational dryers, paddle dryers, plate dryers, belt type dryers, J nauta type dryers, high-frequency dryers, decompression dryers, freeze dryers, channel type blending dryers, rotary dryers, disk dryers, fluidized-bed dryers, air blow type dryers, and infrared dryers. In addition, the pulverizing method is not especially limited, either, and conventional apparatuses are available, such as hammer type pulverizers, impact type pulverizers, roll type pulverizers, and jet gas current type pulverizers.

The water absorption capacities of the water-absorbing agent, as obtained by the production process according to the present invention, under a load, are: preferably not less than 20 g/g (1 hour after initiating the measurement), more preferably not less than 30 g/g, most preferably not less than 35 g/g; and preferably not less than 25 g/g (4 hours after initiating the measurement), more preferably not less than 35 g/g, most preferably not less than 40 g/g.

The average particle size of the water-absorbing agent, as obtained by the production process according to the present invention, is preferably in the range of 10 to 1000 μm, more preferably 100 to 850 μm, most preferably 200 to 600 μm.

In addition, in the present invention, if necessary, various functions can be given to the water-absorbing agent as obtained by the production process according to the present invention by, in the blending step, further adding other materials, such as disinfectants, deodorants, antimicrobial agents, perfumes, various inorganic and organic powders, foaming agents, pigments, dyes, hydrophilic fibers, fillers, hydrophobic fibers, and manure.

The water-absorbing agent, as obtained by the production process according to the present invention, can particularly fitly be used for various absorbent articles, especially, absorbent structures, which are being thinned more and more, such as disposable diapers, sanitary napkins, and incontinent pads, and further, this composition can provide absorbent articles which can remarkably decrease the leakage to thereby keep their surfaces in a rustling dry state even if used for a long time.

Because the water-absorbing agent, as obtained by the production process according to the present invention, can absorb salt water rapidly, it can favorably be used in the wide range of fields, for example, as follows: sanitary material fields, such as water-absorbing agents for various absorbent articles (e.g. disposable diapers, sanitary napkins, and incontinent pads) and for wipers; food fields, such as freshness-keeping agents and drip-absorbing agents for meat and fish; agricultural and horticultural fields, such as water-holding agents for plants and soil and for tree planting of vertical faces; building material fields, such as paint additives and dewfall preventives; communication fields, such as sealing agents for optical cables and for submarine cables; information fields, such as surface-coating agents for print films; industrial fields, such as solidifying agents for hydrous materials; home use article fields, such as disposable pocket heaters and calcium-chloride-based desiccants; and public works fields, such as sealing agents for public works, and concrete admixtures.

In addition, the water-absorbing agent, as obtained by the production process according to the present invention, has an effect of enabling to remove stink substances such as ammonia, acetaldehyde and mercaptan by itself, and is effective as a constituent material of odor control articles.

(Effects and Advantages of the Invention):

In the production process for a basic water-absorbent resin, the crosslinking density distribution in the basic water-absorbent resin becomes more uniform by forwarding the crosslinking reaction and pulverizing the resultant crosslinked mixture at the same time. As a result, basic water-absorbent resin particles being characterized by having uniform particle size, exhibiting an excellent water absorption capacity, and having little extractable content, can be produced with high productivity.

Accordingly, the basic water-absorbent resin as obtained by the process according to the present invention, can not only have the most suitable quality in case of blending with the acid water-absorbent resin but also have the most suitable adjusted particle size at the same time.

Therefore, when the basic water-absorbent resin as obtained by the process according to the present invention, becomes a water-absorbing agent by blending the basic water-absorbent resin and the acidic water-absorbent resin, this water-absorbing agent becomes a high quality water-absorbing agent exhibiting a greatly excellent water absorption capacity under a load.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the extractable content in the basic water-absorbent resin, the water absorption capacity of the basic water-absorbent resin, the water absorption capacity of the water-absorbing agent under a load, and the water content of the acidic water-absorbent resin were measured by the below-mentioned methods. In addition, unless otherwise noted, the units "part(s)" and "%", as hereinafter simply referred to, denote those by weight.

(a) Extractable Content in the Basic Water-Absorbent Resin

A gel of the basic water-absorbent resin, of which the amount (Wa) corresponded to 1 g in terms of solid content, was weighed out with the accuracy of 0.0001 g, and then added into 200 g of pure water, and then stirred for 16 hours. The resultant mixed solution was filtered with filter paper (No. 2 made by ADVANTEC Corporation), and the filtrate was separated. The amount (Wb) corresponding to 1 to 3 mg of dissolved amine component was sampled from the filtrate into a beaker of 200 ml, and then pure water was added thereto to increase the entirety to 50 g, and further, 0.1 N hydrochloric acid was then added thereto to adjust pH from 1 to 2. A few drops of Toluidine Blue was added to the resultant solution, and then a 1/400 mol/l potassium polyvinyl sulfate solution (PVSK, for colloidal titration) was further dropped, when the point at which the color of the solution had changed from blue to reddish violet was regarded as the end point (T). The extractable content of the basic water-absorbent resin was calculated from the following equation:

$$\text{Extractable content of the basic water-absorbent resin (wt \%)} = \frac{T \cdot 1/400 \cdot F \cdot M\{200 + Wa(1 - S/100)\}}{1000 \cdot Wb \cdot Wa \cdot S/100}$$

F: Titer of PVSK
M: Molecular weight of repeating unit
S: Solid content of gel (wt %)

(b) Water Absorption Capacity of the Basic Water-Absorbent Resin and the Acidic Water-Absorbent Resin A gel of the basic water-absorbent resin (or the acidic water-absorbent resin), of which the amount corresponded to 0.2 g in terms of solid content, was weighed out with the accuracy of 0.0001 g, and then added into a bag (60 mm×60 mm) made by nonwoven fabric, then immersed in 100 g of pure water. The bag was pulled up after 24 hours, and the amount (Wc) of the bag was measured after removing water by use of a centrifugal separator (250 G, 3 minutes). In addition, the same procedure is carried out without using the basic water-absorbent resin (or the acidic water-absorbent resin), and then the amount (Wd) of the bag was measured. The water absorption capacity (g/g) of the basic water-absorbent resin (or the acidic water-absorbent resin) was calculated from these weights Wc and Wd, and the following equation:

Water absorption capacity $(g/g) = (Wc - Wd)/0.2 - 1$ (c) Water Absorption Capacity of the Water-Absorbing Agent Under a Load First, 0.9 g of the water-absorbing agent was uniformly spread on a stainless wire mesh of 400 mesh (mesh opening size: 38 μm) as attached by fusion to the bottom of a plastic supporting cylinder with an inner diameter of 60 mm. Next, a piston and a load were mounted in sequence on the above the water-absorbing agent, wherein the piston had an outer diameter of only a little smaller than 60 mm and made no gap with the wall face of the supporting cylinder, but was not hindered from moving up and down, and wherein the piston and the load were adjusted such that a load of 4.9 kPa could uniformly be applied to the water-absorbing agent. Then, the weight (We) of the resultant set of measurement apparatus was measured.

A glass filter plate of 90 mm in diameter is mounted inside a Petri dish of 150 mm, and a salt water (1,000 g in total weight as prepared by adding deionized water (as a solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) is added up to the same level as the surface of the glass filter plate, on which filter paper of 90 mm in diameter is then mounted such that its entire surface will be wetted, and further, an excess of liquid is removed.

The above set of measurement apparatus is mounted on the above wet filter paper, thereby allowing the water-absorbing agent to absorb the liquid under the load. After the water-absorbing agent has absorbed the liquid for a predetermined time, the set of measurement apparatus is lifted to measure its weight (Wf) again. The value, as given by subtracting We from Wf, is divided by the weight (0.9 g) of the water-absorbing agent, thus determining the water absorption capacity (g/g) of the water-absorbing agent under a load. The above measurement is carried out with the piston and the load still mounted. After the measurement of the weight has ended, the set of measurement apparatus is mounted on the above wet filter paper again, thereby allowing the water-absorbing agent to absorb the salt water under the load until the next predetermined time. Thereafter, the above operation is repeated to determine the water absorption capacity of the water-absorbing agent under a load after an unit time.

(d) Water Content of the Acidic Water-Absorbent Resin

The initial weight (Wg) of the acidic water-absorbent resin is beforehand measured, and then the weight (Wh) is measured after drying in a hot-air dryer of 180° C. for 3 hours. The value, as given by subtracting Wh from Wg, is divided by Wg, and the resultant divided value is represented by the percentage, which is regarded as the water content (%) of the acidic water-absorbent resin.

REFERENTIAL EXAMPLE 1

First, 1008.8 parts of acrylic acid, 8.63 parts of N,N'-methylenebisacrylamide as a copolymerizable crosslinking agent, and 3960.9 parts of pure water were mixed. The resultant mixture was degassed with nitrogen gas for 60 minutes and then put into an airtight vessel possible to open and close, and the displacement of the internal air of the reaction system with nitrogen was continued with the liquid temperature kept at 20° C. under the nitrogen atmosphere. Next, 30.5 parts of 10 weight % aqueous 2,2'-azobis(2-amidinopropane) dihydrochloride solution, 10.8 part of 10 weight % aqueous hydrogen peroxide solution, and 25.2 parts of 1 weight % aqueous L-ascorbic acid solution were added under stirring. As a result, after 5 minutes, a polymerization reaction got started, and after 30 minutes, the reaction system reached the peak temperature. Thirty minutes after the polymerization temperature reached its peak, the resultant hydrogelled crosslinked polymer was got out and passed through a meat chopper, thus obtaining the hydrogelled crosslinked polymer. This hydrogelled crosslinked polymer was dried in a hot blow dryer of 130° C. for 1 hour. The resultant dried product is pulverized by a roll-granulator (made by Nippon Granulator Co., Ltd.). The resultant powder was passed through a wire mesh (mesh opening size: 850 μm), and the resultant passed product was collected, thus obtaining acidic water-absorbent resin (1). Incidentally, acidic water-absorbent resin (1) as obtained has a water content of 6% and a water absorption capacity of 14 g/g in pure water.

REFERENTIAL EXAMPLE 2

First, 800 parts of acrylic acid, 1150 parts of 50 weight % aqueous 2-(meth)acrylamido-2-methylpropanesulfonic acid solution, 5.35 parts of N,N'-methylenebisacrylamide as a copolymerizable crosslinking agent, and 2930 parts of pure water were mixed. The resultant mixture was degassed with nitrogen gas for 60 minutes and then put into an airtight vessel possible to open and close, and the displacement of the internal air of the reaction system with nitrogen was continued with the liquid temperature kept at 20° C. under the nitrogen atmosphere. Next, 30.3 parts of 10 weight % aqueous 2,2'-azobis(2-amidinopropane) dihydrochloride solution, 33.3 part of 3 weight % aqueous hydrogen peroxide solution, and 50 parts of 0.5 weight % aqueous L-ascorbic acid solution were added under stirring. As a result, after 1 minutes, a polymerization reaction got started, and after 17 minutes, the reaction system reached the peak temperature. Thirty minutes after the polymerization temperature reached its peak, the resultant hydrogelled crosslinked polymer was got out and passed through a meat chopper, thus obtaining the hydrogelled crosslinked polymer. This hydrogelled crosslinked polymer was dried in a hot blow dryer of 60° C. for 1 hour, and further, dried in a decompression dryer of 60° C. for 3 hour. The resultant dried product is pulverized by a roll-granulator (made by Nippon Granulator Co., Ltd.). The resultant powder was passed through a wire mesh (mesh opening size: 850 μm), and the resultant pass product was collected, thus obtaining acidic water-absorbent resin (2). Incidentally, acidic water-absorbent resin (2) as obtained has a water content of 15%.

EXAMPLE 1

Ethylene glycol diglycidyl ether (Denacol EX-810, Nagase Kasei Kogyo Co., Ltd., solid content: 100%) as a crosslinking agent with a supplying speed of 7.3 g/minute was supplied to 100% polyethylenimine (Epomin SP-200, made by Nippon Shokubai Co., Ltd.) with a supplying speed of 72.7 g/minute, thus obtaining the mixture thereof continuously. Simultaneously, the mixture was continuously added into KRC Kneader (volume: 1.2 liter, made by Kurimoto Co., Ltd.) equipped with a twin rotating shaft at 53 rpm and a jacket and passed through KRC Kneader in order to forward a crosslinking reaction of the mixture by giving shear stress and to pulverize the resultant crosslinked product at the same time, thus obtaining basic water-absorbent resin (1) according to the present invention continuously. Then, the temperature of water that was passed into the jacket was 80° C. Basic water-absorbent resin (1), according to the present invention, had an extractable content of 3.4% and a water absorption capacity of 6.5 g/g. 98 weight % of the basic water-absorbent resin particles have a particle size of 10 to 1000 μm, and the average particle size is 270 μm. The particles of 10 to 1000 μm in basic water-absorbent resin (1), according to the present invention, included: 6% of particles of 1000 to 850 μm, 14% of particles of 850 to 500 μm, 22% of particles of 500 to 300 μm, 43% of particles of 300 to 150 μm, and 15% of particles of 150 to 10 μm.

EXAMPLE 2

5000 g of 30% polyethylenimine (Epomin P-1000, made by Nippon Shokubai Co., Ltd.) was added into a reaction vessel comprising a stainless-made double-arm type kneader (volume: 10 liters) equipped with two sigma type stirring blades and a jacket, and a cover thereof, and further, 1597 g of 9.4% aqueous N,N'-methylenebisacrylamide solution (80° C.) was added with stirring at 40 rpm in order to forward a crosslinking reaction of the resultant mixture by giving shear stress and to pulverize the resultant crosslinked product at the same time. Then, the temperature of the jacket was 60° C. Three minutes after initiating the reaction in the kneader, the resultant pulverized gel was exhausted from the kneader and passed through DOME-GRAN (made by Fuji Paudal Co., Ltd.) thereafter, thus obtaining basic water-absorbent resin (2) according to the present invention. Basic water-absorbent resin (2), according to the present invention, had an extractable content of 3.1% and a water absorption capacity of 9.5 g/g. 98 weight % of the basic water-absorbent resin particles have a particle size of 10 to 1000 μm after drying, and the average particle size is 210 μm. The particles of 10 to 1000 μm in basic water-absorbent resin (2) after drying included: 7% of particles of 850 to 500 μm, 22% of particles of 500 to 300 μm, 43% of particles of 300 to 150 μm, and 28% of particles of 150 to 10 μm.

EXAMPLE 3

Basic water-absorbent resin (3), according to the present invention, was obtained in the same way as of Example 2 except that the temperature of the jacket was changed to 25° C. and the reaction time in the kneader was changed to 10 minutes. Basic water-absorbent resin (3) as obtained, according to the present invention, had an extractable content of 3.4% and a water absorption capacity of 9.7 g/g. 99 weight % of the basic water-absorbent resin particles have a particle size of 10 to 1000 μm after drying, and the average particle size is 230 μm. In addition, the particles of 10 to 1000 μm in basic water-absorbent resin (3) after drying included: 9% of particles of 850 to 500 μm, 25% of particles of 500 to 300 μm, 40% of particles of 300 to 150 μm, and 26% of particles of 150 to 10 μm.

EXAMPLE 4

Basic water-absorbent resin (4), according to the present invention, was obtained in the same way as of Example 2 except that a meat chopper equipped with a helical backflow inhibiting part in the casing of the meat chopper was used in stead of DOME-GRAN. Basic water-absorbent resin (4) as obtained, according to the present invention, had an extractable content of 3.2% and a water absorption capacity of 9.5 g/g. 93 weight % of the basic water-absorbent resin particles have a particle size of 10 to 1000 μm after drying, and the average particle size is 165 m. In addition, the particles of 10 to 1000 μm in basic water-absorbent resin (4) after drying included: 13% of particles of 1000 to 850 μm, 7% of particles of 850 to 500 μm, 9% of particles of 500 to 300 μm, 25% of particles of 300 to 150 μm, and 46% of particles of 150 to 10 μm.

EXAMPLE 5

While N,N'-methylenebisacrylamide (9.4% solution, 80° C.) as a crosslinking agent with a supplying speed of 58 g/minute was supplied to 30% polyethylenimine (Epomin P-1000, made by Nippon Shokubai Co., Ltd.) with a supplying speed of 182 g/minute, both are added into KRC Kneader having a twin rotating shaft at 53 rpm and a jacket (volume: 1.2 liter, made by Kurimoto Co., Ltd.) and passed through KRC Kneader in order to forward a crosslinking reaction of the resultant mixture by giving shear stress and to pulverize the resultant crosslinked product at the same time, thus obtaining basic water-absorbent resin (5) according to the present invention continuously. Then, the temperature of water that was passed into the jacket was 80° C. Basic water-absorbent resin (5), according to the present invention, had an extractable content of 3.5% and a water absorption capacity of 10.4 g/g. 84 weight % of the basic water-absorbent resin particles have a particle size of 10 to 1000 μm after drying, and the average particle size is 650 μm. In addition, the particles of 10 to 1000 μm in basic water-absorbent resin (5) after drying, included: 34% of particles of 1000 to 850 μm, 31% of particles of 850 to 500 μm, 22% of particles of 500 to 300 μm, 11% of particles of 300 to 150 μm, and 2% of particles of 150 to 10 μm.

EXAMPLE 6

While N,N'-methylenebisacrylamide (9.4% solution, 80.° C.) as a crosslinking agent with a supplying speed of 83 g/minute was supplied to 50% polyethylenimine (Epomin P-1050, made by Nippon Shokubai Co., Ltd.) with a supplying speed of 157 g/minute, both are added into KRC Kneader having a twin rotating shaft at 53 rpm and a jacket (volume: 1.2 liter, made by Kurimoto Co., Ltd.) and passed through KRC Kneader in order to forward a crosslinking reaction of the resultant mixture by giving shear stress and to pulverize the resultant crosslinked product at the same time, thus obtaining basic water-absorbent resin (6) according to the present invention continuously. Then, the temperature of water that was passed into the jacket was 80° C. Basic water-absorbent resin (6), according to the present invention, had an extractable content of 4.7% and a water absorption capacity of 8.0 g/g. 88 weight % of the basic water-absorbent resin particles have a particle size of 10 to 1000 μm after drying, and the average particle size is 290 μm. In addition, the particles of 10 to 1000 μm in basic water-absorbent resin (6) after drying, included: 21% of particles of 1000 to 850 μm, 12% of particles of 850 to 500 μm, 16% of particles of 500 to 300 μm, 35% of particles of 300 to 150 μm, and 16% of particles of 150 to 10 μm.

EXAMPLE 7

While N,N'-methylenebisacrylamide (9.4% solution, 80° C.) as a crosslinking agent with a supplying speed of 58 g/minute was supplied to 50% polyethylenimine (Lupasol-P, made by BASF) with a supplying speed of 157 g/minute, both are added into KRC Kneader having a twin rotating shaft at 53 rpm and a jacket (volume: 1.2 liter, made by Kurimoto Co., Ltd.) and passed through KRC Kneader in order to forward a crosslinking reaction of the resultant mixture by giving shear stress and to pulverize the resultant crosslinked product at the same time, thus obtaining basic water-absorbent resin (7) according to the present invention continuously. Then, the temperature of water that was passed into the jacket was 80° C. Basic water-absorbent resin (7), according to the present invention, had an extractable content of 4.3% and a water absorption capacity of 7.3 g/g. 88 weight % of the basic water-absorbent resin particles have a particle size of 10 to 1000 $\mu$m after drying, and the average particle size is 305 $\mu$m. In addition, the particles of 10 to 1000 $\mu$m in basic water-absorbent resin (7) after drying, included: 19% of particles of 1000 to 850 $\mu$m, 18% of particles of 850 to 500 $\mu$m, 14% of particles of 500 to 300 $\mu$m, 29% of particles of 300 to 150 $\mu$m, and 20% of particles of 150 to 10 $\mu$m.

EXAMPLE 8

Basic water-absorbent resin (8), according to the present invention, was obtained in the same way as of Example 1 except that the supplying speed of ethylene glycol diglycidyl ether (Denacol EX-810, Nagase Kasei Kogyo Co., Ltd.) as a crosslinking agent was changed into 5.5 g/minute. Basic water-absorbent resin (8) as obtained, according to the present invention, had an extractable content of 4.6% and a water absorption capacity of 11.1 g/g. 95 weight % of the basic water-absorbent resin particles have a particle size of 10 to 1000 $\mu$m, and the average particle size is 310 $\mu$m. The particles of 10 to 1000 $\mu$m in basic water-absorbent resin (8) included: 8% of particles of 1000 to 850 $\mu$m, 18% of particles of 850 to 500 $\mu$m, 27% of particles of 500 to 300 $\mu$m, 29% of particles of 300 to 150 $\mu$m, and 18% of particles of 150 to 10 $\mu$m.

EXAMPLE 9

Ethylene glycol diglycidyl ether (Denacol EX-810, Nagase Kasei Kogyo Co., Ltd., solid content: 100%) as a crosslinking agent with a supplying speed of 7.3 g/minute was supplied to 100% polyethylenimine (Lupasol-WF, made by BASF) with a supplying speed of 72.7 g/minute, thus obtaining the mixture thereof continuously. Simultaneously, the mixture was continuously added into KRC Kneader (volume: 1.2 liter, made by Kurimoto Co., Ltd.) equipped with a twin rotating shaft at 53 rpm and a jacket and passed through KRC Kneader in order to forward a crosslinking reaction of the mixture by giving shear stress and to pulverize the resultant crosslinked product at the same time, thus obtaining basic water-absorbent resin (9) according to the present invention continuously. Then, the temperature of water that was passed into the jacket was 80° C. Basic water-absorbent resin (9), according to the present invention, had an extractable content of 3.5% and a water absorption capacity of 5.2 g/g. 98 weight % of the basic water-absorbent resin particles have a particle size of 10 to 1000 $\mu$m, and the average particle size is 275 $\mu$m. The particles of 10 to 1000 $\mu$m in basic water-absorbent resin (9), according to the present invention, included: 3% of particles of 1000 to 850 $\mu$m, 16% of particles of 850 to 500 $\mu$m, 25% of particles of 500 to 300 $\mu$m, 38% of particles of 300 to 150 $\mu$m, and 18% of particles of 150 to 10 $\mu$m.

EXAMPLE 10

Basic water-absorbent resin (10), according to the present invention, was obtained in the same way as of Example 1 except that methyl acrylate (Wako Pure Chemicals Co., Ltd.) was supplied with a supplying speed of 3.7 g/minute in stead of ethylene glycol diglycidyl ether as a crosslinking agent. Basic water-absorbent resin (10) as obtained, according to the present invention, had an extractable content of 2.7% and a water absorption capacity of 2.4 g/g. 99 weight % of the basic water-absorbent resin particles have a particle size of 10 to 1000 $\mu$m, and the average particle size is 265 $\mu$m. The particles of 10 to 1000 $\mu$m in basic water-absorbent resin (10) included: 1% of particles of 1000 to 850 $\mu$m, 17% of particles of 850 to 500 $\mu$m, 27% of particles of 500 to 300 $\mu$m, 28% of particles of 300 to 150 $\mu$m, and 27% of particles of 150 to 10 $\mu$m.

EXAMPLE 11

Basic water-absorbent resin (11), according to the present invention, was obtained in the same way as of Example 10 except that ethyl acrylate (Wako Pure Chemicals Co., Ltd.) was supplied with a supplying speed of 3.7 g/minute in stead of methyl acrylate. Basic water-absorbent resin (11) as obtained, according to the present invention, had an extractable content of 3.5% and a water absorption capacity of 3.4 g/g. 96 weight % of the basic water-absorbent resin particles have a particle size of 10 to 1000 $\mu$m, and the average particle size is 305 $\mu$m. The particles of 10 to 1000 $\mu$m in basic water-absorbent resin (11) included: 3% of particles of 1000 to 850 $\mu$m, 20% of particles of 850 to 500 $\mu$m, 29% of particles of 500 to 300 $\mu$m, 33% of particles of 300 to 150 $\mu$m, and 15% of particles of 150 to 10 $\mu$m.

EXAMPLE 12

Forty parts of basic water-absorbent resin (1) as obtained in Example 1, 60 parts of acidic water-absorbent resin (1) as obtained in Referential Example 1, and 0.3 parts of silica particles (Reolosil QS-20, Tokuyama Co., Ltd.) were dry blended, thus obtaining water-absorbing agent (1) according to the present invention. The water absorption capacities of water-absorbing agent (1) under a load were: 36.7 g/g (1 hour after initiating the measurement), and 42.5 g/g (4 hours after initiating the measurement).

EXAMPLE 13

One hundred parts of basic water-absorbent resin (2) as obtained in Example 2 and 37.5 parts of acidic water-absorbent resin (1) as obtained in Referential Example 1 were blended in a kneader with stirring, thus obtaining a mixture of both the resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a vertical pulverizer (VM27-S, Orient Co., Ltd.). The resultant powder was passed through a wire mesh (mesh opening size: 850 $\mu$m), and the resultant passed product was collected, thus obtaining water-absorbing agent (2) according to the present invention. The water absorption capacities of water-absorbing agent (2) under a load were: 37.9 g/g (1 hour after initiating the measurement), and 43.9 g/g (4 hours after initiating the measurement).

EXAMPLE 14

One hundred parts of basic water-absorbent resin (2) as obtained in Example 2 and 58.3 parts of acidic water-absorbent resin (2) as obtained in Referential Example 2 were blended in a kneader with stirring, thus obtaining a mixture of both the resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a vertical pulverizer (VM27-S, Orient Co., Ltd.). The resultant powder was passed through a wire mesh (mesh opening size: 850 μm), and the resultant passed product was collected, thus obtaining water-absorbing agent (3) according to the present invention. The water absorption capacities of water-absorbing agent (3) under a load were: 39.0 g/g (1 hour after initiating the measurement), and 40.5 g/g (4 hours after initiating the measurement).

EXAMPLE 15

Water-absorbing agent (4), according to the present invention, was obtained in the same way as of Example 13 except that: the silica particles, which were blended before pulverizing by the vertical pulverizer, were blended with the mixture before hot-blow drying of 80° C. The water absorption capacities of water-absorbing agent (4) under a load were: 35.8 g/g (1 hour after initiating the measurement), and 42.7 g/g (4 hours after initiating the measurement).

EXAMPLE 16

Water-absorbing agent (5), according to the present invention, was obtained in the same way as of Example 13 except that: a turbulizer (Hosokawa Micron Co., Ltd.) was used in order to blend basic water-absorbent resin (2) as obtained in Example 2 and acidic water-absorbent resin (1) as obtained in Referential Example 1 in stead of the kneader. The water absorption capacities of water-absorbing agent (5) under a load were: 37.6 g/g (1 hour after initiating the measurement), and 43.7 g/g (4 hours after initiating the measurement).

EXAMPLE 17

Water-absorbing agent (6), according to the present invention, was obtained by use of basic water-absorbent resin (3) as obtained in Example 3, and by drying, pulverizing and collecting after blending with acidic water-absorbent resin (1) in the same way as of Example 13. The water absorption capacities of water-absorbing agent (6) under a load were: 36.3 g/g (1 hour after initiating the measurement), and 42.6 g/g (4 hours after initiating the measurement).

EXAMPLE 18

Water-absorbing agent (7), according to the present invention, was obtained by use of basic water-absorbent resin (4) as obtained in Example 4, and by drying, pulverizing and collecting after blending with acidic water-absorbent resin (1) in the same way as of Example 13. The water absorption capacities of water-absorbing agent (7) under a load were: 36.5 g/g (1 hour after initiating the measurement), and 43.0 g/g (4 hours after initiating the measurement).

EXAMPLE 19

Twelve thousand and seventy-five parts of basic water-absorbent resin (4) as obtained in Example 4 and 3935 parts of acidic water-absorbent resin (1) as obtained in Referential Example 1 were blended in a high-speed shear type mixer (Cyclomix, made by Hosokawa Micron Co., Ltd.) having water amount of 50 L with stirring, thus obtaining a mixture of both the resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a vertical pulverizer (VM27-S, Orient Co., Ltd.). The resultant powder was passed through a wire mesh (mesh opening size: 850 em), and the resultant passed product was collected, thus obtaining water-absorbing agent (8) according to the present invention. The water absorption capacities of water-absorbing agent (8) under a load were: 37.0 g/g (1 hour after initiating the measurement), and 43.5 g/g (4 hours after initiating the measurement).

EXAMPLE 20

One hundred parts of basic water-absorbent resin (5) as obtained in Example 5 and 37.5 parts of acidic water-absorbent resin (1) as obtained in Referential Example 1 were blended in a kneader with stirring, thus obtaining a mixture of both the resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a desk pulverizer. The resultant powder was passed through a wire mesh (mesh opening size: 850 μm), and the resultant passed product was collected, thus obtaining water-absorbing agent (9) according to the present invention. The water absorption capacities of water-absorbing agent (9) under a load were: 36.7 g/g (1 hour after initiating the measurement), and 42.5 g/g (4 hours after initiating the measurement).

EXAMPLE 21

One hundred parts of basic water-absorbent resin (5) as obtained in Example 5 and 37.5 parts of acidic water-absorbent resin (1) as obtained in Referential Example 1 were blended in a kneader with stirring, thus obtaining a mixture of both resins. 0.21 parts of silica particles was blended with 100 parts of the mixture and dried in a fluidized-bed dryer (Pulvis Mini-Bed GA22 type, Yamato Kagaku Co., Ltd.) of 80° C. for 15 minutes. Thereafter, the resultant dried product was pulverized by a desk pulverizer. The resultant powder was passed through a wire mesh (mesh opening size: 850 μm), and the resultant passed product was collected, thus obtaining water-absorbing agent (10) according to the present invention. The water absorption capacities of water-absorbing agent (10) under a load were: 36.5 g/g (1 hour after initiating the measurement), and 42.6 g/g (4 hours after initiating the measurement).

EXAMPLE 22

One hundred parts of basic water-absorbent resin (6) as obtained in Example 6 and 53.85 parts of acidic water-absorbent resin (1) as obtained in Referential Example 1 were blended in a kneader with stirring, thus obtaining a mixture of both the resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a desk pulverizer. The resultant powder was passed through a wire mesh (mesh opening size: 850 μm), and the resultant passed product was collected, thus obtaining water-absorbing agent (11) according to the present invention. The water absorption capacities of water-absorbing agent (11) under a load were: 37.4 g/g (1 hour after initiating the measurement), and 44.0 g/g (4 hours after initiating the measurement).

EXAMPLE 23

Water-absorbing agent (12), according to the present invention, was obtained by use of basic water-absorbent resin (7) as obtained in Example 7 in stead of 100 parts of basic water-absorbent resin (6) according to the present invention, and by drying, pulverizing and collecting after blending with acidic water-absorbent resin (1) in the same way as of Example 22. The water absorption capacities of water-absorbing agent (12) under a load were: 36.3 g/g (1 hour after initiating the measurement), and 42.7 g/g (4 hours after initiating the measurement).

EXAMPLE 24

Forty parts of basic water-absorbent resin (8) as obtained in Example 8, 60 parts of acidic water-absorbent resin (1) as obtained in Referential Example 1, and 0.3 parts of silica particles were dry blended, thus obtaining water-absorbing agent (13) according to the present invention. The water absorption capacities of water-absorbing agent (13) under a load were: 30.2 g/g (1 hour after initiating the measurement), and 38.3 g/g (4 hours after initiating the measurement).

EXAMPLE 25

Forty parts of basic water-absorbent resin (9) as obtained in Example 9, 60 parts of acidic water-absorbent resin (1) as obtained in Referential Example 1, and 0.3 parts of silica particles were dry blended, thus obtaining water-absorbing agent (14) according to the present invention. The water absorption capacities of water-absorbing agent (14) under a load were: 31.5 g/g (1 hour after initiating the measurement), and 40.1 g/g (4 hours after initiating the measurement).

EXAMPLE 26

Forty parts of basic water-absorbent resin (10) as obtained in Example 10, 60 parts of acidic water-absorbent resin (1) as obtained in Referential Example 1, and 0.3 parts of silica particles were dry blended, thus obtaining water-absorbing agent (15) according to the present invention. The water absorption capacities of water-absorbing agent (15) under a load were: 30.7 g/g (1 hour after initiating the measurement), and 39.9 g/g (4 hours after initiating the measurement).

EXAMPLE 27

Forty parts of basic water-absorbent resin (11) as obtained in Example 11, 60 parts of acidic water-absorbent resin (1) as obtained in Referential Example 1, and 0.3 parts of silica particles were dry blended, thus obtaining water-absorbing agent (16) according to the present invention. The water absorption capacities of water-absorbing agent (16) under a load were: 32.1 g/g (1 hour after initiating the measurement), and 41.1 g/g (4 hours after initiating the measurement).

COMPARATIVE EXAMPLE 1

1.5 mole % of ethylene glycol diglycidyl ether (Denacol EX-810, Nagase Kasei Kogyo Co., Ltd., solid content: 100%) was added into 10% diluted polyethylenimine (prepared by diluting Epomin P-1000 made by Nippon Shokubai Co., Ltd. with water) and the resultant mixture was reacted at 60° C. for 16 hours, thus obtaining comparative basic water-absorbent resin (1). Lump comparative basic water-absorbent resin (1) as obtained was pulverized with an extruder beforehand, and 37.4 parts (as solid content) of the resultant powder and 56.1 parts of acidic water-absorbent resin (1) as obtained in Referential Example 1 were blended. The resultant mixture was passed through a meat chopper twice, thus obtaining a kneaded product of both resins. The kneaded product as obtained was dried in a hot blow dryer of 80° C. for 2 hours. The resultant dried product is pulverized by a desk pulverizer. The resultant powder was passed through a wire mesh (mesh opening size: 850 µm), and the resultant passed product was collected, thus obtaining comparative water-absorbing agent (1). The water absorption capacities of comparative water-absorbing agent (1) under a load were: 17.5 g/g (1 hour after initiating the measurement), and 24.9 g/g (4 hours after initiating the measurement).

EXAMPLE 28

An effect of neutralizing smell as to water-absorbing agent (1) as obtained in Example 1 according to the present invention, was determined by the following method. One gram of water-absorbing agent (1) as obtained in Example 1 according to the present invention, was added into a 500 cc airtight vessel which contained 20 g of physiological salt solution (0.9% sodium chloride solution) including 1% ammonia, and the resultant mixture was gelled. The ammonia amount of the head space in the vessel after 1 hour was lowered and not higher than 37% of blank (in case of not adding the water-absorbing agent). One gram of water-absorbing agent (1) as obtained in Example 1 according to the present invention, was added into a sealed 500 cc vessel which contained 20 g of physiological salt solution (0.9% sodium chloride solution) including 1% acetaldehyde, and the resultant mixture was gelled. The acetaldehyde amount of the head space in the vessel after 1 hour was lowered and not higher than 10% of blank (in case of not adding the water-absorbing agent). From these result, it would be understood that the water-absorbing agent, according to the present invention, has an effect of removing ammonia and acetaldehyde.

EXAMPLE 29

First, 3500 parts of N-vinylformamide (available from Aldrich) and 1390 parts of pure water were blended. The resultant mixture was degassed with nitrogen gas for 60 minutes and then put into an airtight vessel possible to open and close, and the displacement of the internal air of the reaction system with nitrogen was continued with the liquid temperature kept at 20° C. under the nitrogen atmosphere. Next, 104.8 parts of 10 weight % aqueous 2,2'-azobis(2-amidinopropane) dihydrochloride solution was added and the solution temperature was adjusted to 60° C. Then, a polymerization reaction got started. The resultant viscous liquid was got out and added into methanol in order to precipitate a polymer. The polymer was dried in a decompression dryer of 40° C. for 2 days, thus obtaining poly(N-vinylformamide). 4287.3 parts of 10 weight % aqueous poly(N-vinylformamide) solution, 3925.3 parts of pure water and 362 parts of sodium hydroxide were blended with stirring and the solution temperature was adjusted to 75° C. 6 N hydrogen chloride solution was added dropwise into the solution after 6 hours in order to prepare its hydrochloride salt. Thereafter, this solution was added into methanol in order to precipitate a polymer. The polymer was dried in a decompression dryer of 50° C. for 1 day, thus obtaining polyvinylamine hydrochloride. Next, an aqueous polyvinylamine solution was obtained by dissolving the polyvinylamine hydrochloride in a sodium hydroxide solution. Ethylene glycol diglycidyl ether (Denacol EX-810, Nagase Kasei Kogyo Co., Ltd.) as a crosslinking agent with a supplying speed of 2.73 g/minute was continuously supplied to KRC Kneader (volume: 1.2 liter, made by Kurimoto Co., Ltd.) equipped with a jacket, with supplying 10% aqueous polyvinylamine solution as obtained with a supplying speed of 182 g/minute. Then, the rotational speed of KRC Kneader was 53 rpm and the jacket temperature was 80° C. A crosslinking reaction of the resultant mixture was forwarded by giving shear stress and the resultant crosslinked product was pulverized at the same time because of passing through KRC Kneader. Then, basic water-absorbent resin (12) according to the present invention was exhausted continuously. Basic water-absorbent resin (12), according to the present invention, had an extractable content of 0.2% and a water absorption capacity of 18.0 g/g. 82 weight % of the basic water-absorbent resin particles have a particle size of 10 to 1000 μm after drying, and the average particle size is 540 μm. The particles of 10 to 1000 μm in basic water-absorbent resin (12) after drying, according to the present invention, included: 29% of particles of 1000 to 850 μm, 25% of particles of 850 to 500 μm, 18% of particles of 500 to 300 μm, 13% of particles of 300 to 150 μm, and 15% of particles of 150 to 10 m.

EXAMPLE 30

One hundred gram of basic water-absorbent resin (12) as obtained in Example 29, according to the present invention, was washed in 1000 parts of pure water for 1 day and successively dried in a decompression dryer of 40° C. for 2 days. The resultant washed product was pulverized by a desk pulverizer, thus obtaining basic water-absorbent resin (13), according to the present invention, as particles of not more than 850 μm.

EXAMPLE 31

Eight hundred and eighty-three parts of basic water-absorbent resin (12) as obtained in Example 29 and 100 parts of acidic water-absorbent resin (1) as obtained in Referential Example 1 were blended in a kneader with stirring, thus obtaining a mixture of both resins. The mixture was dried in a hot blow dryer of 80° C. for 1 hour, and further, 0.3 parts of silica particles (Reolosil QS-20, Tokuyama Co., Ltd.) were blended with 100 parts of the resultant dried product. Thereafter, the resultant mixture was pulverized by a desk pulverizer. The resultant powder was passed through a wire mesh (mesh opening size: 850 μm), and the resultant passed product was collected, thus obtaining water-absorbing agent (17) according to the present invention. The water absorption capacities of water-absorbing agent (17) under a load were: 20.7 g/g (1 hour after initiating the measurement), and 23.6 g/g (4 hours after initiating the measurement).

EXAMPLE 32

Fifty parts of basic water-absorbent resin (13) as obtained in Example 30 and 50 parts of acidic water-absorbent resin (1) as obtained in Referential Example 1 were dry blended, thus obtaining water-absorbing agent (18) according to the present invention. The water absorption capacities of water-absorbing agent (18) under a load were: 29.4 g/g (1 hour after initiating the measurement), and 37.3 g/g (4 hours after initiating the measurement).

EXAMPLE 33

A mixture of 32.7 g of polyethylenimine (Epomin SP-200, made by Nippon Shokubai Co., Ltd., 100% in terms of solid resin) and 3.27 g of ethylene glycol diglycidyl ether (Denacol EX-810, Nagase Kasei Kogyo Co., Ltd., solid content: 100%) as a crosslinking agent, and 44 g of acidic water-absorbent resin (1) as obtained in Referential Example 1, were passed through KRC Kneader (volume: 1.2 liter, made by Kurimoto Co., Ltd.) which was equipped with a twin rotating shaft at 53 rpm and a jacket, for 1 minute. Next, 0.23 g of silica particles (Reolosil QS-20 QS-20, Tokuyama Co., Ltd.) were blended with the resultant passed product, thus obtaining water-absorbing agent (19) according to the present invention. The water absorption capacities of water-absorbing agent (19) under a load in salt water were: 33.0 g/g (1 hour after initiating the measurement), and 39.5 g/g (4 hours after initiating the measurement).

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a water-absorbing agent, said water-absorbing agent comprising an acidic water-absorbent resin and a basic water-absorbent resin having irregular shape particles, the process comprising the step of
    combining a basic resin and a crosslinking agent in a reaction vessel and crosslinking said basic resin while applying shear stress to said basic resin in order to obtain said irregular shape basic water-absorbent resin particles.

2. The production process for a water-absorbing agent of claim 1, said combining step being carried out by coexisting with the acidic water-absorbent resin to obtain a mixture of the acidic water-absorbent resin and the basic water-absorbent resin.

3. The production process for a water-absorbing agent of claim 1, further comprising the step of blending said acidic water-absorbent resin with basic water-absorbing resin to produce said water-absorbing agent.

4. The production process for a water-absorbing agent of claim 1, wherein said acidic water-absorbent resin is a particle having a water content of less than 20 weight %.

5. The production process for a water-absorbing agent of claim 2, further comprising the step of discharging the entirety of said basic water-absorbent resin from a reaction vessel and thereafter discharging and pulverizing said basic water-absorbent resin.

6. The production process for a water-absorbing agent of claim 2, further comprising the steps of continuously supplying said basic resin and crosslinking agent into said reaction vessel,
    continuously crosslinking said basic resin and pulverizing said basic water-absorbent resin in said reaction vessel, and
    continuously discharging the resulting pulverized product from said reaction vessel.

7. The production process for a water-absorbing agent of claim 1, wherein at least 80 weight % of said water-absorbent agent has a particle size of 10 μm to 1000 μm.

8. The production process for a water-absorbing agent of claim 3, further comprising the steps of
    advancing said crosslinking reaction while pulverizing said basic water-absorbent agent in said reaction vessel and thereafter discharging the entirety of the resulting pulverized product.

9. The production process for a water-absorbing agent of claim 3, further comprising the steps of
supplying said basic resin and said crosslinking agent into said reaction vessel and crosslinking and pulverizing said basic water-absorbent resin in said reaction vessel, and thereafter discharging the entirety of the resulting pulverized product from said reaction vessel.

10. The production process for a water-absorbing agent of claim 1, comprising the step of applying said shear stress to pulverize said basic water-absorbent resin.

11. A production process for a water-absorbing agent, said water-absorbing agent comprising an acidic water-absorbent resin and an irregular shape basic water-absorbent resin, said process comprising the steps of
combining a basic resin and a crosslinking agent in a reaction vessel and crosslinking said basic resin while applying shear stress to said basic resin to obtain said irregular shape basic water-absorbent resin, and
adding said acidic water-absorbent resin either before and/or during said crosslinking reaction or after said crosslinking reaction.

12. The production process for a water-absorbing agent of claim 11, wherein said acidic water-absorbent resin is added to said basic water-absorbent resin before and/or during said crosslinking reaction.

13. The production process for a water-absorbing agent of claim 11, wherein said acidic water-absorbent resin is blended with said basic water-absorbent resin after said crosslinking reaction.

14. A production process for a water-absorbing agent, said water-absorbing agent comprising an acidic water-absorbent resin and an irregular shape basic water absorbent resin, the process comprising the step of
combining a basic resin and a crosslinking agent in a reaction vessel and crosslinking said basic resin while applying shear stress to said basic resin to obtain particles of said irregular shape basic water-absorbent resin,
where said process further comprises the step of blending said acidic water-absorbent resin with the basic water-absorbent resin, or the step of obtaining a mixture of an acidic water-absorbent resin and the basic water-absorbent resin, where said basic water-absorbent resin coexists with the acidic water-absorbent resin when carrying out the crosslinking reaction.

15. The process of claim 11, wherein said process comprises continuously combining said basic resin with said crosslinking agent and continuously crosslinking said basic resin, and
continuously adding said water-absorbent resin to said basic resin.

* * * * *